Patented Mar. 27, 1923.

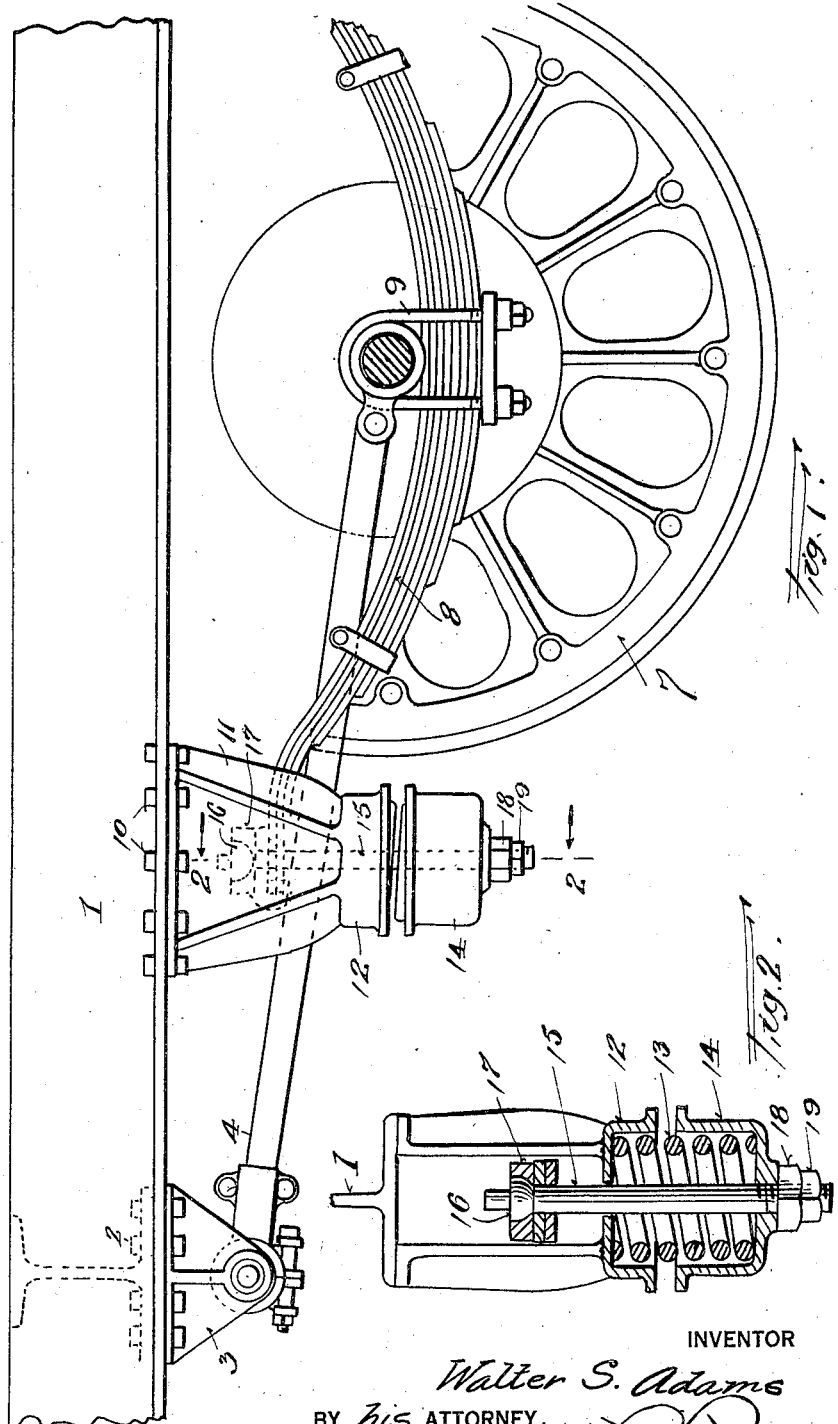

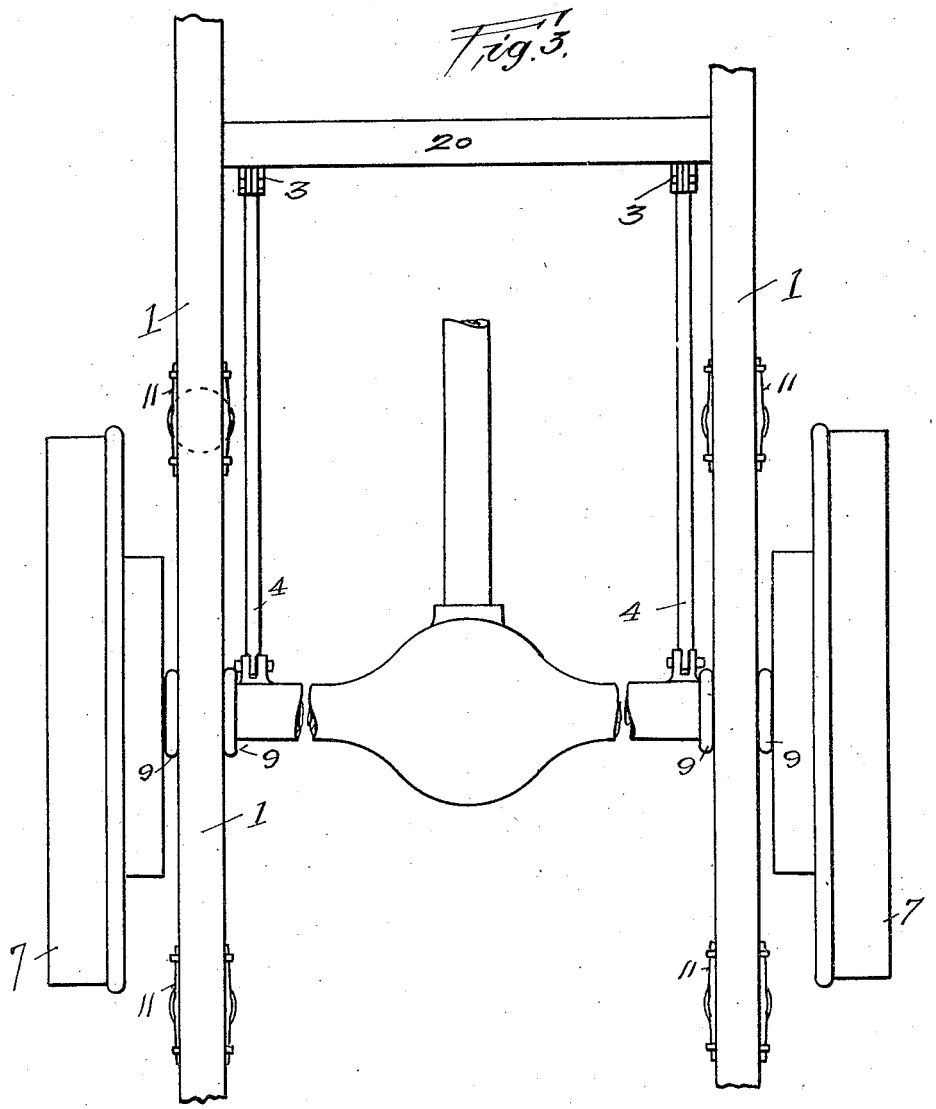

1,449,927

UNITED STATES PATENT OFFICE.

WALTER S. ADAMS, OF PHILADELPHIA, PENNSYLVANIA, ASSIGNOR TO THE J. G. BRILL COMPANY, OF PHILADELPHIA, PENNSYLVANIA, A CORPORATION OF PENNSYLVANIA.

RUNNING GEAR FOR VEHICLES.

Application filed July 22, 1922. Serial No. 576,639.

*To all whom it may concern:*

Be it known that I, WALTER S. ADAMS, a citizen of the United States, and resident of the city of Philadelphia, county of Philadelphia, and State of Pennsylvania, have invented a certain new and useful Improvement in Running Gears for Vehicles, of which the following is a specification.

This invention relates particularly to a running gear adapted for use on railway cars propelled by internal combustion engines although it may be successfully used upon automobile trucks or the like, and has for its object to provide a running gear and spring system which will convey light as well as heavy loads without jar and undue vibration.

With these objects and other objects which may hereinafter appear, in view, I have devised the particular arrangement of parts hereinafter set forth and more particularly pointed out in the claims appended hereto.

Reference is to be had to the accompanying drawing forming a part hereof in which—

Figure 1 is a side elevation partly in section of my improved running gear;

Figure 2 is a sectional view on the line 2—2 of Figure 1 looking in the direction of the arrows, and Figure 3 is a plan view of my improved running gear, parts being shown in section to disclose construction.

Throughout the various views of the drawings, similar reference characters designate similar parts.

In the preferred embodiment of my invention as shown in the accompanying drawing, 1 indicates the lower portion or side members of the vehicle body frame which are connected by cross members 20 to one of which is secured by means of the bolts 2, brackets 3 in which the ends of radius rods 4 are pivotally secured. These radius rods 4 extend to the rear axle housing 5 to which they are pivotally secured at 6.

At 7 is shown one of the driving wheels and 8 shows one of the semi-elliptic springs which are supported from the axle housing by means of the U-bolts 9. Secured to the underside of the car body frame 1 by means of suitable bolts 10 are U-shaped brackets 11 each of which has its lower end terminating in a cup-shaped spring cap 12 which rests upon a coil spring 13 supported in a cup-shaped spring seat 14 which is carried by a link 15 depending from the end of the leaf spring 8 and having, adjacent its upper end, a rounded portion in the form of a half-ball shown at 16. This portion 16 is supported in a suitable bearing block 17 which rests upon the end of the leaf spring 8. At 18 and 19 are shown nuts on the end of the link 15 for the purpose of adjusting the height of the body and retaining the spring seat 14 in position.

From the foregoing the operation of my improved device will be readily understood.

When light loads are imposed upon the car, these loads are carried by the coil spring 13 as this spring is lighter and more resilient than the leaf spring 8. As the load is increased, the cup shaped members 12 and 14 come into contact and consequently further compression of the coil spring 13 is prevented and further stresses are then imposed upon the leaf spring 8.

From the foregoing, it is obvious that my invention is not to be restricted to the exact embodiment shown but is broad enough to cover all structures coming within the scope of the annexed claims.

What I claim is:—

1. A running gear for vehicles comprising a vehicle body, a pair of driving wheels, an axle housing, a pair of brackets extending downward from the vehicle body, radius rods pivotally mounted in said brackets and having their other ends pivotally attached to the axle housing, leaf springs carried below the axle housing, links depending downward from the ends of said spring, said links having half-ball ends and bearings on the ends of the leaf spring for receiving said ends, a coil spring surrounding each of said links, a seat carried on said link for supporting said spring and a cap for said spring and means for securing said cap to the car body.

2. A running gear for vehicles comprising a vehicle body, a pair of driving wheels, pivotal connections between said body and axle housing, leaf springs carried by said axle housing, brackets carried by said body, links carried by the ends of said springs, spring seats carried by said links, coil springs carried by said seats and extending between said seats and brackets and means on said seats and brackets for contacting upon the imposition of a predetermined load upon said coil spring and transferring the load to the leaf springs.

3. A running gear for vehicles comprising a pair of driving wheels, an axle housing, leaf springs carried by said axle housing, brackets carried by the vehicle body, spring seats carried by the ends of the leaf springs, coil springs carried by said seats and extending between said seats and brackets and means on said seats and brackets adapted to contact upon the imposition of a predetermined load on said coil springs.

Signed at the city and county of Philadelphia, State of Pennsylvania, this 1st day of July, 1922.

WALTER S. ADAMS.